(12) United States Patent
Epel et al.

(10) Patent No.: US 10,535,998 B2
(45) Date of Patent: Jan. 14, 2020

(54) CONTROLLING A BEHIND THE METER ENERGY STORAGE AND DISPATCH SYSTEM TO IMPROVE POWER EFFICIENCY

(71) Applicant: WindLogics Inc., Juno Beach, FL (US)

(72) Inventors: Aaron J G Epel, Jupiter, FL (US); Mohammadreza Rezaie, Jupiter, FL (US); Matthew D Briercliffe, Coon Rapids, MN (US); Benjamin D Grindy, Minneapolis, MN (US); Sriharsha Veeramachaneni, Minneapolis, MN (US); Kenneth A Williams, Minneapolis, MN (US); Jay K Limbasiya, West Palm Beach, FL (US); Gordon W Paynter, Falcon Heights, MN (US); Gary D Moncrief, Jr., Port St. Lucie, FL (US); Ryan R. Butterfield, Farmington, MN (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 54 days.

(21) Appl. No.: 15/833,665

(22) Filed: Dec. 6, 2017

(65) Prior Publication Data
US 2019/0173283 A1 Jun. 6, 2019

(51) Int. Cl.
*H02J 3/28* (2006.01)
*G05B 13/04* (2006.01)
*H02J 3/00* (2006.01)

(52) U.S. Cl.
CPC .............. *H02J 3/28* (2013.01); *G05B 13/048* (2013.01); *H02J 2003/003* (2013.01)

(58) Field of Classification Search
CPC ...... H02J 3/28; H02J 2003/003; G05B 13/048
See application file for complete search history.

(56) References Cited

U.S. PATENT DOCUMENTS

| | | |
|---|---|---|
| 6,185,483 B1 | 2/2001 | Drees |
| 6,577,962 B1 | 6/2003 | Afshari |
| 7,254,944 B1 | 8/2007 | Goetzinger et al. |

(Continued)

*Primary Examiner* — Thomas C Lee
*Assistant Examiner* — Michael Tang
(74) *Attorney, Agent, or Firm* — Tarolli, Sundheim, Covell & Tummino LLP

(57) ABSTRACT

One example includes a forecast engine that generates forecast data that characterizes predicted operating conditions of an energy storage system for a given time period in the future, wherein the predicted operating conditions are based on a load history for a power consuming premises coupled to the energy storage system and on a value history for power provided to and consumed from a power grid. The load history of the power consuming premises characterizes unmetered power transferred to the power consuming premises, metered powered transferred from the power grid to the power consuming premises and metered powered exchanged from the energy storage system to the power grid. In the example, a schedule manager generates an operation schedule for operating the energy storage system. The operation schedule includes charge and discharge patterns for an energy storage source that are tuned to curtail power costs and/or elevate power revenue value.

29 Claims, 5 Drawing Sheets

(56) References Cited

U.S. PATENT DOCUMENTS

| | | | | |
|---|---|---|---|---|
| 2012/0130556 A1* | 5/2012 | Marhoefer | ............... | H02J 3/32 |
| | | | | 700/291 |
| 2015/0039145 A1* | 2/2015 | Yang | ..................... | G05B 13/02 |
| | | | | 700/291 |
| 2015/0302318 A1* | 10/2015 | Chen | ..................... | G06N 20/00 |
| | | | | 706/12 |
| 2015/0364919 A1* | 12/2015 | Schumer | .................. | H02J 3/14 |
| | | | | 700/291 |
| 2016/0097556 A1* | 4/2016 | Seo | ....................... | G05B 15/02 |
| | | | | 700/276 |
| 2017/0005515 A1* | 1/2017 | Sanders | .................. | H02J 3/381 |
| 2017/0371306 A1* | 12/2017 | Sossan | ................ | G05B 13/048 |
| 2019/0052090 A1* | 2/2019 | Kobayashi | ............... | H02J 3/38 |

* cited by examiner

CONTROLLING A BEHIND THE METER ENERGY STORAGE AND DISPATCH SYSTEM TO IMPROVE POWER EFFICIENCY

TECHNICAL FIELD

The present disclosure relates to systems and methods for controlling an energy storage system to improve power efficiency.

BACKGROUND

Energy forecasting is a term that refers to "forecasting in the energy industry". Energy forecasting includes but is not limited to forecasting demand (load) and cost of electricity, fossil fuels (natural gas, oil, coal) and renewable energy sources (RES; hydro, wind, solar). Energy forecasting can also be employed to describe both point and probabilistic (e.g., interval and density).

Load forecasting (electric load forecasting, electric demand forecasting) is a sub-field of energy forecasting. In load forecasting, the term "load" denotes a demand (in kW) or energy (in kWh) and since the magnitude of power and energy is the same for hourly data, usually no distinction is made between demand and energy. Load forecasting involves the accurate prediction of both the magnitudes and geographical locations over the different intervals of the planning horizon. The basic quantity of interest is typically the hourly total system (or zonal) load. However, load forecasting is also concerned with the prediction of hourly, daily, weekly and monthly values of load and of the peak load, or of individual building loads.

SUMMARY

One example relates to a non-transitory machine-readable medium having machine-readable instructions. The machine-readable instructions include a forecast engine that generates forecast data that characterizes predicted operating conditions of an energy storage system for a given time period in the future. The predicted operating conditions are based on a load history for a power consuming premises coupled to the energy storage system and on a value history for power provided to and consumed from a power grid. The load history of the power consuming premises characterizes unmetered power transferred to the power consuming premises, metered powered transferred from the power grid to the power consuming premises and metered powered exchanged from the energy storage system to the power grid. The machine-readable instructions also include a schedule manager that generates an operation schedule for operating the energy storage system based on the forecast data. The operation schedule includes charge and discharge patterns that are tuned to curtail power cost and/or elevate power revenue value for operating the energy storage system over the given time period in the future. The schedule manager causes a controller of the energy storage system to change operation modes that charges and discharges an energy storage source of the energy storage system over the given time period based on the operation schedule over the given time period based on the operation schedule.

Another example relates to an energy storage system that includes an energy storage source that stores electric power and a power regulator disconnectedly coupled to the energy storage source and to a power grid. The power regulator includes a controller that controls an operation mode of the energy storage system. The energy storage system also includes an operation computer that dictates the operation mode of the energy storage system. The operating computer includes a non-transitory memory that stores machine-readable instructions and a processing unit that accesses the memory and executes the machine-readable instructions. The machine-readable instructions include a forecast engine that generates forecast data that characterizes predicted operating conditions of the energy storage system for a given time period in the future. The predicted operating conditions are based on a load history for the energy storage system and on a value history for power provided to and consumed from the power grid. The machine readable instructions also include a schedule manager that generates an operation schedule for operating the energy storage system based on the forecast data that dictates time intervals to charge and discharge the energy storage source. The operation schedule is tuned to curtail power cost and/or elevate power revenue value for operating the energy storage system over the given time period in the future.

Yet another example relates to a method that includes predicting operating conditions of an energy storage system that characterizes a predicted load for a power consuming premises coupled to the energy storage system for a time period in the future and a value history for power provided to and consumed from a power grid. The load history of the power consuming premises characterizes unmetered power transferred to the power consuming premises, metered powered transferred from the power grid to the power consuming premises and metered powered exchanged from the energy storage system to the power grid. The method also includes determining an operation schedule for the energy storage system for the time period in the future based on the predicted operating conditions. The operation schedule specifies operation of the energy storage system in a plurality of different operation modes for a plurality of different time intervals within the time period. The method further includes changing an operation mode of the energy storage system based on the operation schedule to charge and discharge an energy storage source of the energy storage system in a manner to elevate revenue and curtail cost.

DETAILED DESCRIPTION

Figure 1:
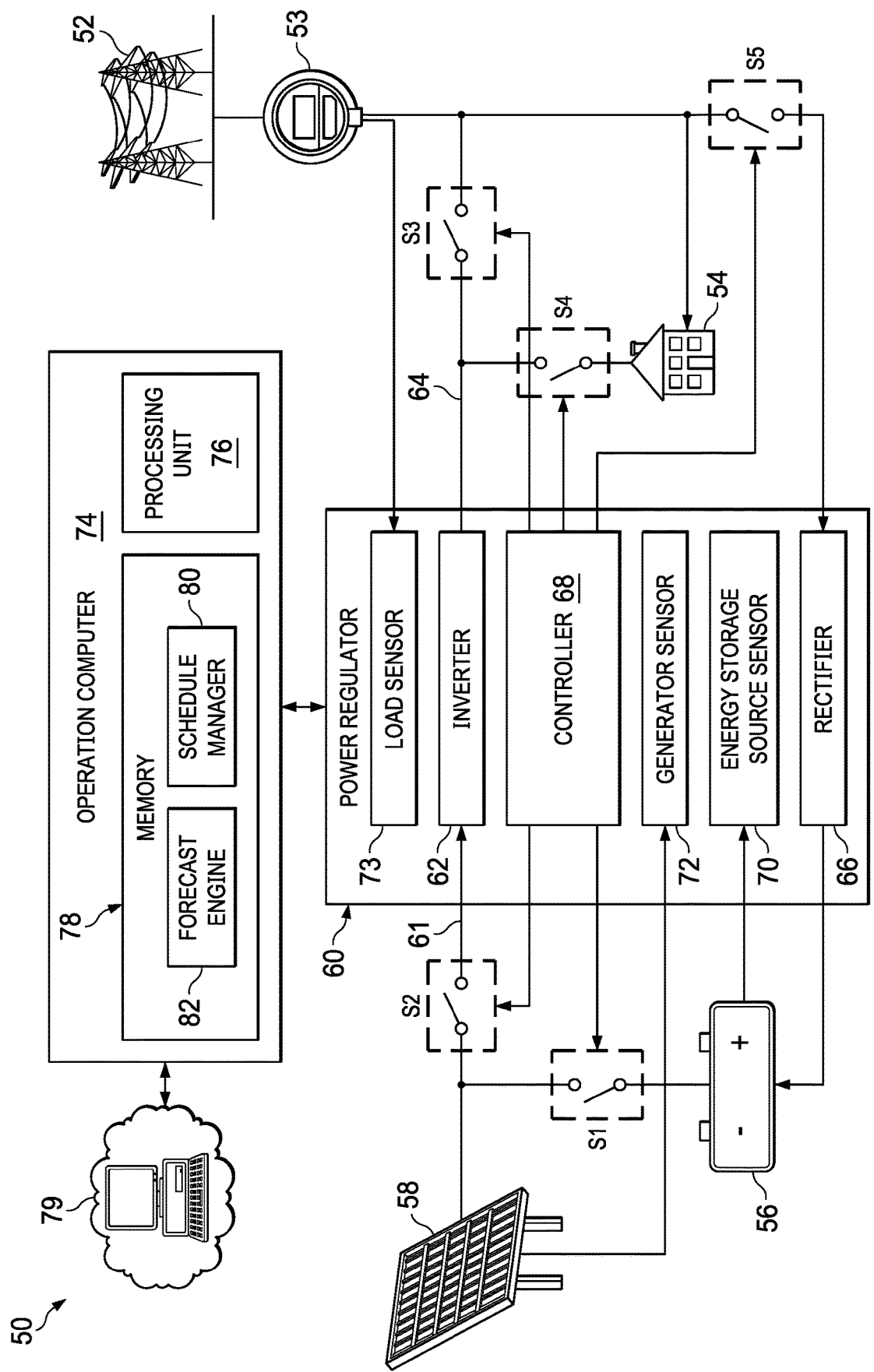
FIG. 1 illustrates an example of an energy storage system that is controlled to intermittently provide power to a power grid.

This disclosure relates to an energy storage system that controls energy storage and discharge in real-time. As one example, the energy storage system can be employed to control charging and discharge (dispatch) of a "behind the meter" energy storage source (e.g., a battery system) that is connected to a generator. In another example, the system can control charging and discharging of a battery bank in a utility system.

The energy storage system includes an operation computer programmed to weigh a variety of factors in determining a method for decided when to charge and when to discharge the energy storage source to improve power efficiency of the energy storage system, elevate corresponding revenue and curtail operational costs. In particular, the operation system includes a forecasting engine that predicts future operating conditions of the energy storage system. The operating conditions can include, for example, a predicted load (energy demands) of the energy storage system that is based on time of day, weather, historical usage, etc.; and/or the presence of solar generation at the premise; or the presence of dispatchable resources such as HVAC units. The forecasting engine also determines a power revenue value and a power cost (collectively referred to as a power value) for power that changes as a function of time, market conditions, utility rate tariffs, etc. The power cost for power represents an asset cost for delivered power from a power grid and the power revenue value represents an amount of revenue that is accumulated for providing power to the power grid. The operation computer includes a schedule manager that can employ the predicted operating conditions (e.g., predicted future load requirements), the power cost and the power revenue value to determine the operation schedule with time intervals that the energy storage system is to be charging and time intervals that the energy storage system is to be discharging.

Upon determining the operating schedule, the energy storage system operates in real-time to control the charging and discharging of the energy storage system in a manner that is tuned to improve power efficiency, elevate revenue and curtail costs. For example, a controller of the energy storage system is programmed to cause the energy storage system to charge an energy storage source during a time when a load of the power grid is predicted to be low (e.g., "off-peak time"). Further, the system can cause the energy storage system to discharge the energy storage source during a time when a high load is predicted (e.g., "peak time"). Moreover, in some situations, the energy storage system may discharge and re-charge the energy storage source during an extended interval that a low load (e.g., "off-peak time") is predicted.

The operating computer re-evaluates the predicted operating conditions, the power cost and the power revenue value at preset intervals (e.g., every 5 minutes to 1 hour) to determine if an adjustment to the method is needed. In this manner, as predicted operating conditions and/or market conditions change, the system can make adjustments to change a time for charging and discharging the energy storage source.

FIG. 1 illustrates an example of an energy storage system 50 that is configured to intermittently provide alternating current (AC) power (energy) to a power grid 52. The energy storage system 50 may also be referred to an energy storage and dispatch system. In some examples, the energy storage system 50 can be implemented as a utility based system (e.g., in a power distribution system). In other examples, the energy storage system 50 may be implemented in a single premises system. In such a situation, the energy storage system 50 also provides power to a premises 54. The premises 54 could be a residential or commercial power consuming premises. Moreover, the premises 54 is labeled in FIG. 1 as "PREMISES LOAD" to denote that the premises 54 represents a load (power demand) at the premises 54.

A meter 53 monitors power provided downstream from the power grid 52 to the premises 54. Additionally, the meter 53 monitors power provided upstream from the premises 54 to the power grid 52. The energy storage system 50 is illustrated as being a "behind the meter" system. However, in other examples, the energy storage system 50 could be a "front-of-meter" system operated by a utility service provider. As used herein, the term "behind the meter" denotes an energy storage system that is designed and fabricated to provide power for a single premises (e.g., the premises 54). Additionally, as used herein, the term "front-of-meter" system refers to an energy storage system operated by a utility services provider that provides power to a plurality of premises, such as an energy storage system coupled to a power grid supplying power to the plurality of premises.

The energy storage system 50 also includes an energy storage source 56 that stores electric power. The energy storage source 56 is implemented as a DC energy storage source, such as a battery. The energy storage source 56 could be representative of a single battery, multiple batteries coupled as a battery bank or an alternative form of a DC power source, such as but not limited to fly wheels and/or flow batteries. In some examples, the energy storage source 56 can be implemented as a lithium ion battery or an array of lithium ion batteries. As some other non-limiting examples, the energy storage source 56 could be formed of nickel metal hydride battery cells, nickel cadmium battery cells, lead-acid battery cells, or nearly any type of chemical battery.

In some examples, the energy storage system 50 includes an energy generator 58. In other examples, the energy generator 58 may be omitted. The energy generator 58 can be a renewable energy generator, such as a photovoltaic (PV) array, a wind turbine, a hydroelectric generator, etc. In other examples, the energy generator 58 can be implemented as a fossil fuel generator, such as a diesel or gasoline generator.

The energy storage source 56 and the energy generator 58 are disconnectedly coupled to a power regulator 60 at an input node 61. A switch S1 is coupled between the energy storage source 56 and the input node 61. Similarly, a switch S2 is coupled between the energy generator 58 and the input node 61 of the power regulator 60. As used herein, the term "disconnectedly coupled" indicates that two nodes (e.g., the input node and the energy storage source 56) are intermittently electrically connected based on a status of a switch (e.g., the switch S1).

The power regulator 60 can operate as a signal conditioner. Accordingly, the power regulator includes an inverter 62 that is also coupled to the input node 61. It is understood that the inverter 62 could be representative of multiple inverters. For example, in some situations, the energy storage source 56 and the energy generator 58 could be connected to separate inverters. In other examples, the energy storage source 56 and the energy generator 58 could be coupled to the same inverter. The inverter 62 converts an input signal input, such as DC input signal or an AC input signal into a power grid input signal that is provided on an output node 64. The output node 64 is disconnectedly coupled to the power grid 52 via a switch S3 and disconnectedly coupled to the premises 54 via a switch S4. The power grid input signal provided at the output node 64 is an AC signal that substantially matches the voltage, frequency and phase of signals provided on the power grid 52. In this manner, application of the power grid input signal to the power grid 52 augments the power available to the power grid 52 and/or reduces an amount of power (e.g., a load) from the power grid 52 that is consumed by the premises 54.

In some examples, the power grid 52 is disconnectedly coupled to a rectifier 66 of the power regulator 60 via a switch S5. The rectifier 66 converts a grid output signal (e.g., an AC signal) provided by the power grid 52 into a DC charging signal that is employable to charge the energy storage source 56.

The power regulator 60 includes a controller 68 that controls the state of the switches S1-S5. The controller 68 could be implemented, for example, as a microcontroller, an application specific integrated circuit (ASIC) chip, a field programmable gate array (FPGA), etc. Further, it is understood that the switches S1-S5 are included for representation of a logical connection between nodes. The switches S1-S5 could be representative of relays, transistors or other electrical devices external to the power regulator 60. Alternatively, some (or all) of the switches S1-S5 could be representative of electrical devices internal to the power regulator 60 (e.g., logic gates, solid state relay, transistors, etc.). Moreover, the particular arrangement of the switches S1-S5 is not meant to be limiting. Rather, as described herein, the switches S1-S5 are employed to represent current flow in different operation modes the energy storage system 50.

The power regulator 60 includes an energy storage source sensor 70 that can detect a state of charge (SOC) of the energy storage source 56. That is, the energy storage source sensor 70 can calculate (e.g., substantially in real-time) data that characterizes an amount of charge (e.g., in kilowatt hours) that is stored by the energy storage source 56, which amount of charge is referred to as the SOC of the energy storage source 56. In some examples, the energy storage source sensor 70 can be implemented as a battery meter.

Additionally, the power regulator 60 includes a generator sensor 72 that can calculate data characterizing a real-time output capacity of the energy generator 58. The real-time output capacity of the energy generator 58 can vary based on the type of energy generator 58 implemented. For example, if the energy generator 58 is implemented as a PV array, the output capacity of the energy generator 58 could be a DC voltage level. In an example where the energy generator 58 is a fossil fuel generator (e.g., a diesel generator), the output capacity of the energy generator 58 could be a DC voltage level or an AC voltage level. The output of the energy generator 58 can vary as a function of time and/or environmental conditions (e.g., temperature, cloud coverage, wind speed, etc.).

Still further, the power regulator 60 can include a load sensor 73. The load sensor 73 can provide a real-time estimate of a load (demand) at the premises 54 based on data provided from the meter 53.

The energy storage system 50 can operate in a plurality of different modes that can be changed based on a state of the switches S1-S5. The controller 68 can cause the energy storage system 50 to switch operation modes through the selective opening and closing of the switches S1-S5. Additionally, as described herein, the controller 68 can receive commands (or an operation schedule) for controlling the operation mode from an external source, such as an operation computer 74.

The energy storage system 50 operates in a charge mode or a discharge mode. In the charge mode, the energy storage source 56 is charged and in a discharge mode, the energy storage source 56 is discharged (dispatched). Moreover, depending on the architecture of the energy storage system 50, additional "sub-modes" of the charge mode and discharge mode are possible.

For example, the energy storage system 50 can operate in a local charging mode (a sub-mode of the charging mode) wherein the energy generator 58 (e.g., local/proximal to the premises 54) charges the energy storage source 56. In the local charging mode, switch S1 is closed, and switch S2 is opened. Moreover, switch S5 is opened to disconnect the power grid 52 from the rectifier 66. Furthermore, in some instances of the local charging mode, the premises 54 can be supplied power by the power grid 52, such that switches S3 and S4 can be opened.

Additionally, the energy storage system 50 can operate in a power grid charging mode (a sub-mode of the charging mode). In the power grid charging mode, the power grid 52 applies power to the rectifier 66 that is converted into a DC signal employed to charge the energy storage source 56. In the power grid charging mode, the switch S5 is closed and the switch S1 is opened. In some instances of the power grid charging mode, the switches S2, S3 and S4 may be closed.

Further, the energy storage system 50 can operate in a combined charging mode. In the combined charging mode (a sub-mode of the charging mode), signals from both the energy generator 58 and the power grid 52 are employed to charge the energy storage source 56. In such a situation, switches S1, S2 and S5 are closed.

The energy storage system 50 can also operate in a power grid discharge mode (a sub-mode of the discharging mode). In the power grid discharge mode, the energy storage system 50 is set to provide a maximum amount of power to the power grid 52. In the power grid discharge mode, the switches S1 and S2 (if present) are closed. Additionally, the switch S3 is closed and the switches S4 and S5 are opened. Accordingly, in the power grid discharge mode, nearly the entire power grid input signal on the output node 64 is provided to the power grid 52.

The energy storage system 50 can still further operate in a premises discharge mode (a sub-mode of the discharging mode). In the premise discharge mode, the energy storage system 50 is set to reduce the amount of power from the power grid 52 that the premises 54 consumes. In the premises discharge mode, the switch S1, S2 and S4 are closed, and the switches S3 and S5 are opened. In this manner, nearly the entire power grid input signal on the output node 64 is provided to the premises 54, thereby reducing the amount of power provided from the power grid 52 that is consumed by the premises 54.

In another situation, the energy storage system 50 can operate in a combined discharge mode (a sub-mode of the discharging mode). In the combine discharge mode, power (in the form of the power grid input signal) is provided to the power grid 52 and the premises 54. In the combined discharge mode, the switches S1, S2, S3 and S4 are closed and the switch S5 is opened.

As noted, in some examples, the controller 68 of the power regulator 60 can receive commands from the operation computer 74. The operation computer 74 can be a general-purpose computing device. In some examples, the operation computer 74 can be representative of an appliance. In other examples, the operation computer 74 can be implemented as a desktop computer, a laptop computer, etc. In some examples, the operation computer 74 and the power regulator 60 can communicate via a local area network. In other examples, the operation computer 74 and the power regulator 60 can communicate wirelessly, such as over a Wi-Fi network or a Bluetooth network. In still other examples, the operation computer 74 and the power regulator 60 can be integrated.

The operation computer 74 includes a processing unit 76. The processing unit 76 can be implemented, for example, as one or more processor cores. The operation computer 74 can also include a memory 78. The memory 78 is implemented as a non-transitory machine-readable medium. The memory 78 can be implemented, as volatile or non-volatile memory, such as random access memory (RAM), flash memory, a solid state drive, a hard disk driver or a combination thereof.

The operation computer 74 is a node on a network 79. The network 79 can be presentative of a public network (e.g., the Internet), a private network (e.g., a carrier network) or a combination thereof (e.g., a carrier network coupled to the Internet, a virtual private network, etc.). The memory 78 includes a schedule manager 80 that can collect data from the power regulator 60 (e.g., via the controller 68). The collected data can include the load data determined by the load sensor 73, the generator data determined by the generator sensor 72 and the energy storage data determined by the energy storage source sensor 70. The collected data can be provided to a forecast engine 82.

Additionally, in some examples, the schedule manager 80 can receive a commitment schedule from an external source via the network 79. The commitment schedule may be generated by a server (e.g., a power control server) that communicates with a plurality of instances of the energy storage system 50 to aggregate data to improve the accuracy of the commitment schedule. The commitment schedule may include one or more compulsory events. Each compulsory event can be implemented as a time intervals for operating in a particular operation mode that may be based on a pre-existing commitment (agreement).

The forecast engine 82 aggregates the collected data over time to generate a load history for the premises 54. Additionally, the forecast engine 82 receives data from the network 79 (which may be provided with the commitment schedule) characterizing a substantially real-time value (a power cost) for power delivered from the power grid 52 and a revenue value for power delivered to the grid (a power revenue value). The forecast engine 82 can aggregate the power cost and the power revenue value over time to determine a value history that characterizes a history of the power revenue value for power provided to the power grid 52 and a history of power cost of power provided from the power grid 52 over time.

Additionally, the forecast engine 82 can receive weather data from a weather server (or other external system) via the network 79. The weather data can include a prediction of temperature and/or weather events (e.g., rain, snow, cloudiness, hurricane predictions, etc.) for a future time period (e.g., up to about 10 days in the future).

The forecast engine 82 predicts operating conditions of the energy storage system 50 for a future time period (e.g., 24 hours). In particular, the forecast engine 82 can generate a prediction for the load, and the power value (both power revenue value and power cost) for the future time period (e.g., 24 hours) based on the load history, the power value history and the weather data. The prediction of the load and the power value can collectively be referred to as forecast data.

The forecast engine 82 predicts operating conditions of the energy storage system 50 for the future time period (e.g., 24 hours). In particular, the forecast engine 82 can generate a prediction for the load, and the power value (both power revenue value and power cost) for the future time period. The forecast may include a point estimate, or a range of likely operating conditions (percentiles).

The forecast engine 82 can employ analytics and/or machine learning techniques (e.g., pattern matching, model fitting, clustering, supervised machine learning, multiple-output prediction, etc.) to predict the load for the future time period. In particular, the load forecast engine 82 can predict the load (demand for power) for each interval in the predetermined future time period by analysis of past trends of load at the premises 54, and their relationship to historic weather data, seasonal factors, time-of day factors, and other features that influence load. For example, in a situation where there is heavy rainfall predicted in a specific time interval, the predicted load (demand for power) for that specific time interval may be higher as a consequence.

Moreover, in situations where the energy storage system 50 is implemented as a behind the meter system, the forecast engine 82 employs load history characterizing measurements of power transferred to the load of the premises 54 (the premises load) from the energy generator 58 and/or the energy storage source 56 to predict the load for the future time period. That is, the forecast engine 82 considers power transferred to the load of the premises 54 that is not metered to predict the load. Additionally, continuing with a behind the meter example, the meter 53 combines both load power from the power grid 52 and power exchanged with the power regulator 60 (from the energy generator 58 and/or the energy storage source 56) to provide the estimate of power consumed by the load of the premises 54 that is provided to the load sensor 73. In this manner, the load history of the premises 54 employed by the forecast engine 82 to generate the predicted load characterizes unmetered power transferred to the premises 54, and a combination of metered powered transferred from the power grid 52 to the premises 54 and metered powered exchanged from the power regulator 60 to the power grid 52.

The forecast engine 82 can also employ analytics and/or machine learning techniques to predict the power value (both power revenue value and power cost) for the future time period. In some cases this prediction has a relatively high degree of certainty (e.g., 90% confidence or more). For example, the prediction may achieve this relatively high degree of certainly in a situation where a utility has published rates that vary by time of year and time of day, or a site of the energy storage system 50 is enrolled in a Demand Response program and dispatched during a specified future time period with an agreed price structure. In other examples, there may be a lower degree of certainty (e.g., 50% degree of confidence or less) in a situation where the power value (power revenue value and/or power cost) is set on an energy market and a probabilistic forecast is made by analysis of past trends of power value on the market, the relationship between the power value and historic weather data, seasonal factors, cost inputs to generation (e.g. oil) and/or other market information.

The forecast data can be provided to the schedule manager 80. In response, the schedule manager 80 can use the forecast data to determine an operation schedule for the power regulator 60. In particular, the schedule manager 80 is programmed to execute a tuning/optimization algorithm on a cost function to generate the operation schedule. In this manner, the operation schedule sets the intervals of the modes of operation (charge and discharge mode, and/or associated sub-modes) based on the predicted load, such that the energy storage system 50 curtails and/or minimizes power costs and elevates power revenue value for the future time period. The cost function is the difference between the cost of power (from charges and demand charges) and revenue earned (power revenue value) for the future time period. The tuning/optimization algorithm could be, for example a simplex algorithm or other tuning/optimization algorithm.

In a behind the meter operation, the cost function may be tuned/optimized by the schedule manager 80 to elevate/maximize revenue and curtail/minimize expenditures from all available sources or from a select subset set of sources (e.g., in situations where cost sharing rates are based on contractual agreements). Alternatively, the schedule manager 80 may tune/optimize the cost function to elevate/maximize power availability in a behind the meter or front-of-meter operation. In other examples, other parameters may be considered.

The cost function may differ from site to site. For instance, the cost function for the energy storage system 50 may be different from a cost function for another energy storage system operating at a remote location. The tuning/optimization algorithm may incorporate physical constraints on the energy storage system 50, such as a capacity of the energy storage source 56 (battery capacity) (e.g., megawatt (MW) and megawatt hours (MWh)), round trip efficiency (e.g., energy losses) and depth of discharge limits of the energy storage source 56. Further, the turning/optimization algorithm can incorporate risk arising from uncertainty in the predicted forecast data. For instance, in some situations, the error and/or uncertainty in the forecast data increases over time. Thus, the tuning/optimization algorithm employed by the schedule manager 80 may be adjusted/tuned to tolerate a greater or lesser risk.

Further still, the tuning/optimization algorithm may incorporate predetermined (e.g., user-defined) limits and/or conditions. Such limits and/or conditions can include a condition that the energy storage source 56 be fully charged (or nearly so) at an end of an off-peak time and/or that the energy storage source 56 be fully charged at the beginning of a billing cycle. Still, in other examples, the limits and/or conditions can specify that the load (power demand) is to stay positive, indicating that the energy storage source 56 does not discharge to the power grid 52. It is understood that other limits and/or conditions could additionally or alternatively be employed.

Alternatively, the schedule manager 80 can modify the commitment schedule to provide the operation schedule for the power regulator. The operation schedule can identify different time intervals throughout an upcoming day that the energy storage system 50 operates in the aforementioned operation modes. In some examples, the schedule generated by the schedule manager 80 is set to elevate revenues (e.g., optimize to maximize) and curtail costs (e.g., optimize to minimize) of the energy storage system 50. Moreover, the schedule manager 80 can command the controller 68 of the power regulator 60 to switch modes based on the generated operation schedule.

For example, the operation schedule generated by the schedule manager 80 can command the controller 68 to operate in the combined discharge mode during time when the load is predicted to be relatively high (e.g., near a peak), the power revenue value is also high (e.g., near a peak) and or the power cost is high (e.g., near a peak). Operating the energy storage system 50 in the combined discharge mode elevates power efficiency and revenue by reducing and/or avoiding consumption of power from the power grid 52 at times during which power cost may be high.

Similarly, the operation schedule generated by the schedule manager 80 can command the controller 68 to operate the energy storage system 50 in the combined charging mode in situations where the load is predicted to be relatively low (e.g., off-peak) and the power cost is relatively low (e.g., off-peak). Operating the energy storage system 50 in the combined charging mode elevates power efficiency and revenue by charging the energy storage source 56 at time intervals during which the power cost is relatively low.

The operation schedule generated by the schedule manager 80 may command the controller 68 to operate in the local charge mode in situations where the predicted load is relatively low (e.g., off-peak) and the power revenue value is relatively low (e.g., off-peak), but the power cost is relatively high (e.g., near peak). Alternatively, the schedule manager 80 may command the controller 68 to operate in the local charge mode in situations where the predicted load is relatively low (e.g., off-peak) and the power revenue value is relatively low (e.g., off-peak), the power cost is relatively low (e.g., near peak), and the weather data predicts favorable conditions for generating power (e.g., high winds for a wind turbine, clear sky for a PV array). Operating the energy storage system 50 in the local charge mode during such times elevates power efficiency and revenue by charging the energy storage source 56 with the energy generator 58 and delaying discharge until more favorable market conditions arise. Additionally or alternatively, it may be desirable to operate in the local discharge mode in situations where, although the power cost is relatively high, the energy storage source 56 is depleted to a point at which the energy storage source and the energy generator 58 are unable to keep up with the predicted load (power demand) of the premises 54.

The operation schedule generated by the schedule manager 80 may command the controller 68 to operate in the grid charge mode in situations where the predicted load is relatively low (e.g., off-peak) and the power revenue value is relatively low (e.g., off-peak), the power cost is relatively low (e.g., off-peak), but a cost associated with the generation of power is high. This may be the situation, for instance, in examples where the energy generator 58 is a fossil fuel generator. Operating the energy storage system 50 in the grid charge mode during such times improves power efficiency and elevates revenue by charging the energy storage source 56 with the energy generator 58 and delaying discharge until more favorable market conditions arise.

The operation schedule generated by the schedule manager 80 may command the controller 68 to operate in the premises discharge mode in situations where the predicted load is relatively high (e.g., near peak), the power revenue value is relatively low (e.g., off-peak), the power cost is relatively high (e.g., near peak). It such a situation, it may be desirable to provide power to the premises 54 to reduce the amount of power the premises consumes from the power grid 52. However, in such a situation, the power revenue value may be sufficiently low that discharge of the energy storage source 56 to the power grid 52 is delayed until more favorable market conditions arise.

The operation schedule generated by the schedule manager 80 may command the controller 68 to operate in the grid discharge mode in situations where the predicted load is relatively high (e.g., near peak), the power revenue value is relatively low (e.g., off-peak) and the power cost is lower than the power revenue value. It such a situation, it may be desirable to provide power to the premises 54 to reduce the amount of power the premises consumes from the power grid 52. Accordingly, the power revenue value is sufficiently high that it is advantageous to divert nearly all of the power output by the inverter 62 to the power grid 52.

Upon commanding the controller 68 to operate in a particular mode, the schedule manager 80 periodically (e.g., every 5-60 minutes) and/or asynchronously re-collects updated data (e.g., feedback) to determine if the predicted operating conditions accurately reflect actual operating conditions. The updated data is provided to the forecast engine 82 that generates an updated forecast data to reflect a new prediction for the predetermined time period (e.g., 24 hours). The updated forecast data is returned to the schedule manager 80, and the schedule manager 80 updates the operation schedule accordingly. The schedule manager 80 employs the updated schedule to control an operation mode of the energy storage system 50. In this manner, the operation schedule is set to curtail/minimize the power costs and elevate/maximize power revenue value over the predetermined time period (e.g. 24 hours), but the operation schedule is updated more frequently (e.g., every 5-60 minutes). Accordingly, operation of the energy storage system 50 controlled in real-time to reflect changing market conditions, changing loads and/or changing weather patterns.

By employment of the energy storage system 50, power efficiency is improved by ensuring that power from the energy storage system 56 is available at time intervals of increased load (demand) of the premises 54. Additionally, overall revenue is elevated. Furthermore, in situations where the energy storage system 50 is a behind the meter system operating local to the premises 54, the overall costs for powering the premises 54 is curtailed.

Figure 2:
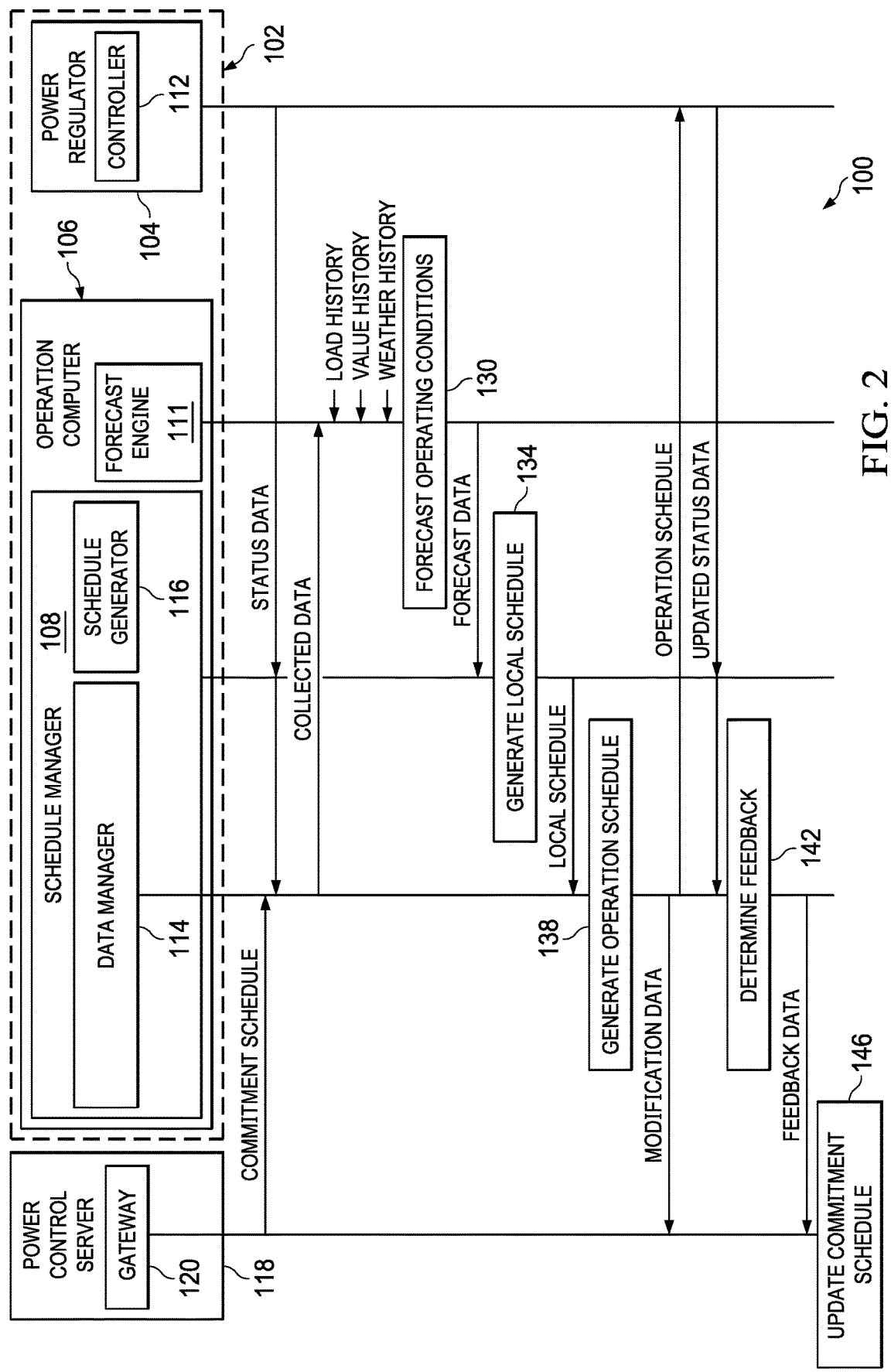
FIG. 2 illustrates a timing diagram depicting control of an energy storage system.

FIG. 2 illustrates a timing diagram 100 for controlling an energy storage system 102. The energy storage system 102 can be employed to implement the energy storage system 50 of FIG. 1. In particular, the energy storage system 102 includes a power regulator 104 that could be employed to implement the power regulator 60 of FIG. 1.

As discussed with respect to FIG. 1, the energy storage system 102 can operate in a plurality of different operation modes. In particular, the power regulator 104 can operate in a charge mode or a discharge mode. Moreover, depending on the architecture of the energy storage system 102, the energy storage system 102 may operate in charge sub-mode, such as a local charge mode, a grid charge mode or a combined charge mode. In the local charge mode, a proximal energy generator (e.g., the energy generator 58 of FIG. 1 is employed to charge an energy storage source (e.g., the energy storage source 56 of FIG. 1). In the grid charge mode, power provided from a power grid (e.g., the power grid 52 of FIG. 1) is employed to charge the energy storage source. In the combined charge mode, power provided from the power grid and power generated by the power generator is concurrently employed to charge the power storage source.

Alternatively, the power regulator can operate in discharge sub-mode, such as a grid discharge mode, a premises discharge mode or a combined discharge mode. In the grid discharge mode, power provided from the energy storage source and the power generator is provided to the power grid. In the premises discharge mode, the power provided from the energy storage source and the power generator is provided to the premises. In the combined discharge mode, power is provided from the energy storage source and the power generator is provided to both the power grid and the premises.

The energy storage system 102 also includes an operation computer 106 that executes a schedule manager 108 and a forecast engine 111. The operation computer 106 could be employed to implement the operation computer 74 of FIG. 1. The operation computer 106 communicates with a controller 112 of the power regulator 104. The schedule manager 108 includes a data manager 114 and a schedule generator 116. The schedule manager 108 and the forecast engine 111 operate in concert to determine an operation mode for the power regulator that changes as a function of time in a manner described herein.

The timing diagram 100 includes a power control server 118. The power control server 118 communicates with the operation computer 106 via a gateway 120. The gateway 120 could be representative of an instance of hardware (e.g., a router), software (e.g., a client portal) or a combination thereof. Additionally, it is understood that in some examples, the power control server 118 may communicate with a plurality of instances of the energy storage system 102.

The power control server 118 provides a commitment schedule to the data manager 114 (labeled in FIG. 2 as "COMMITMENT SCHEDULE"). The commitment schedule includes data characterizing a schedule of operation modes for the energy storage system 102 that may, for example, satisfy pre-existing commitments/agreements. Additionally, the commitment schedule includes data characterizing a current value state of power. The current value state of power includes a current (e.g., near real-time) power cost of power consumed from the grid and power revenue value for power provided to the grid.

Additionally, the controller 112 of the power regulator 104 provides status data to the schedule generator 116 and the data manager 114 (labeled in FIG. 2 as "STATUS DATA"). The status data can include, for example, load data characterizing a current load (power demand) at the premises, storage source data characterizing a state of the energy storage source and generator status that characterizes a current output of the energy generator, etc. In response, the data manager 114 aggregates the commitment schedule and the status data to form collected data. The collected data is provided to the forecast engine 111 (labeled in FIG. 2 as "COLLECTED DATA").

Over time, the forecast engine 111 generates a load history (labeled in FIG. 2 as "LOAD HISTORY") based on multiple instances of the status data and a value history (labeled in FIG. 2 as "VALUE HISTORY") based on multiple instances of the current value state. Alternatively, the load history and/or the value history can be provided from an external source, such as but not limited to the power control server 118. Additionally, the forecast engine 111 receives weather data (labeled in FIG. 2 as "WEATHER DATA") that characterizes predicted weather conditions and events for a certain amount of time in the future (e.g., up to about 10 days) for a geographical area that includes the energy storage system 102. The weather data may be provided, for example, from a weather server.

As indicated by 130, the forecast engine 111 employs the weather data, the load history of the premises and the value history to forecast (predict/estimate) operating conditions of the energy storage system 102. In particular, the forecast engine 111 predicts a load (power demand) of the premises and a power value (power cost and power revenue value) for a predetermined period in the future (e.g., a next 24 hours). In an example where the energy storage system 102 is a behind the meter system, the load history of the premises may characterize unmetered power transferred to the premises, metered powered transferred from the power grid to the premises and metered powered exchanged from the energy storage system 102 to the power grid. Forecast data characterizing the forecasted load and power value (power revenue value and/or power cost) is provided to the schedule generator 116 (labeled in FIG. 2 as "FORECAST DATA"). In some examples, the forecast data may be probabilistic, such that the forecast data may include a predicted range of possible values. In such a situation, uncertainty may increase over time.

As indicated at 134, the schedule generator 116 employs the status data and the forecast data to generate a local schedule for the energy storage system 102. The local schedule generated by the schedule generator 116 identifies time intervals in the predetermined period in the future (e.g., the next 24 hours) that the energy storage system 102 is to operate in the different operation modes. It is understood that in some examples, over the predetermined period in the future, it may be desirable to change between operation modes, and in other examples, it may be desirable to operate in the same operation mode.

The schedule generator 116 provides the local schedule to the data manager 114 (labeled in FIG. 2 as "LOCAL SCHEDULE"). As indicated at 138, the data manager 114 employs the local schedule and the commitment schedule to generate an operation schedule for the energy storage system 102. The operations schedule for the energy storage system 102 can be implemented as a list of scheduled commands that are sent to the controller 112 to control the operation of components, including but not limited to, the energy storage source. To generate the operation schedule 138, the data manager 108 employs a mathematical model and/or optimization approaches to set the operating conditions during a schedule time of intervals to curtail costs and elevate revenue over the future time period. As one example, Equations 1-7 could be employed by the data manager 114 to generate the operation schedule.

$$f(x,y)=\Sigma_{i=1}^{H}(c_i+m_i)x_it_i+\Sigma_{i=1}^{4}d_jy_j+\Sigma_{i=1}^{H}x_i^2+\Sigma_{j=1}^{4}y_i^2 \quad \text{Equation 1:}$$

wherein:

$$l_{ih}-P \leq x_i \forall j=1,\ldots,H\ \&h=\text{high}; \quad \text{Equation 2:}$$

$$l_{il}+P \geq x_i \forall j=1,\ldots,H\ \&l=\text{low}; \quad \text{Equation 2:}$$

$$\Sigma_{i=1}^{j}x_it_i \geq \Sigma_{i=1}^{j}l_{il}+C_{min}-C_0 \forall j=1,\ldots,H; \quad \text{Equation 3:}$$

$$\Sigma_{i=1}^{j}x_it_i \leq \Sigma_{i=1}^{j}l_{ih}+C_{max}-C_0 \forall j=1,\ldots,H; \quad \text{Equation 4:}$$

$$x_i-y_k \leq s_k \forall i=1,\ldots,H\ \&\ k=1,2,3; \quad \text{Equation 5:}$$

$$\max(x_i)-y_4 \leq s_4 \forall i=1,\ldots,H\ \&\ s_4=\max_{demand}; \quad \text{Equation 6:}$$

$$b_i \geq x_i \forall i=1,\ldots,B; \quad \text{Equation 7:}$$

H is the number of time intervals in the future time period (length of a horizon);

$c_i$ is the power cost (energy price) surcharge for a peak period at interval i;

$m_i$ is the fixed power cost (energy price) at interval i;

$t_i$ is the length of interval i (in hours);

$d_j$ is a demand for power (load) price at j;

$x_i$ is a setpoint of power pulled from the power grid at time interval i;

$y_j$ is the increment of the demand for power (load) price at j;

$l_{ih}$ is the upper quantile of load forecast (high) at time interval i;

$l_{il}$ is the lower quantile of load forecast (low) at time interval i;

P is the maximum power storable by the energy storage source;

$C_{max}$ is the high limit (maximum) of the state of charge (SoC) of the energy storage source;

$C_{min}$ is the low limit (minimum) of the state of charge (SoC) of the energy storage source;

$C_0$ is the state of charge (SoC) of the energy storage source at time $t_0$ $b_i$ is demand response baseline minus nomination at time interval i;

B is the length of an event (a state of the energy storage system); and $s_k$ is the latest peak for k;

k is the demand index {1—off peak, 2—semipeak demand; 3—onpeak demand; 4—maximum peak demand}

In one example, the schedule generator 116 attempts to minimize Equation 1 with constraints defined in Equations 2-7 to reduce power drawn (boost power efficiency), curtail power costs and elevate power revenue value. For instance, at given time interval the load of the premises 102 could be 500 kW. In this example, if the setpoint, x for the given time interval is 600 kW, then 100 kW that is provided from the power grid is employed to charge the energy storage source.

Furthermore, the demand price, $d_j$ is based on a maximum demand during one billing period (e.g., 1 months or about 30 days). In bill calculation, a utility provider examines a maximum load for each demand index k {1—off peak, 2—semipeak demand; 3—onpeak demand; 4—maximum peak demand} and that maximum load is multiplied by the corresponding demand increment y for each demand index k. As one example, if a demand for power (load) during a maximum peak demand period is 9 kW and the demand price, $d_j$ (j=4–maximum peak demand) is 1000, the demand charge would be 9000 ($9000 in U.S. currency). For other peak demand charges, the utility providers filters the peak type and the maximum demand (load) for each and multiplies the demand for power (load) by the corresponding demand charge.

Accordingly, in a situation where a premises has a previous maximum demand for power (load) of 89 kW and the maximum demand (during the maximum peak demand; k=4) increases to 90 kW the demand increment, y becomes 1 kW. Therefore, the demand charge would be 1 times $d_4$. Thus, the mathematical model characterized in Equations 1-7 factors many different parameters to determine the operation schedule for the power storage system 102. Furthermore, it is understood that the mathematical model described in Equations 1-7 is not meant to be limiting or exhaustive. Rather, the mathematical model of Equations 1-7 provides an example of parameters for determining the operation schedule. In other examples, more or less factors (and/or other mathematical models) can be employed. Additionally or alternatively, it is understood that the schedule generator 116 could employ a similar or different mathematical model to generate the local scheduled (at 134), which local schedule is refined by the data manager 114 (at 138) to generate the operation schedule for the power storage system 102.

In some examples, the commitment schedule can include compulsory events characterizing intervals of time that the energy storage system 102 operates in certain modes. Additionally or alternatively, the commitment schedule may include suggested (optional) events characterizing time intervals that the energy storage system 102 is requested to operate in certain modes. The data manager 114 weighs such compulsory and/or suggested events with the time intervals identified in the local schedule to generate the operation schedule.

In some examples, the data manager 114 provides the operation schedule to the controller 112 (labeled in FIG. 2 as "OPERATION SCHEDULE"). In response, the controller 112 executes the operation schedule by setting the energy storage system 102 to the operation mode dictated by the operation schedule. In other examples, the data manager can provide command signals (e.g., triggers) to the controller 112 causing the controller to set the energy storage system 102 to the operation mode dictated by the operation schedule.

The operation schedule causes the energy storage system 102 to operate in a manner that improves power efficiency, elevates revenue and curtails costs associated with running the energy storage system 102. In general, as described, the operation schedule schedules operation of the energy storage system 102 in a discharge mode (or one of the discharge sub-modes, namely the premises discharge mode, the grid discharge mode or the combined discharge mode) in situations where the load for the premises is predicted to be relatively high and/or the power revenue value for providing power to the grid is relatively high. Conversely, the operation schedule operations of the energy storage system in the charge modes (or one of the sub-mode of the charge mode, namely the local charge mode, the grid charge mode or the combined charge mode) in situations where the load for the premises is predicted to be relatively low and/or the power cost for grid power is predicted to be relatively low.

Additionally, the operation schedule may cause the energy storage system 102 to rapidly switch between a charge mode and a discharge mode over an extended time interval within the predetermined amount of time where the load is predicted to be low. For instance, during an extended time period, such as a weekend, a commercial premises may be predicted to have a relatively low load (power demand), and the operation schedule causes the energy storage system 102 to charge and discharge the power storage source over that extended time interval.

Periodically and/or asynchronously, the controller 112 provides an updated version of the status data (labeled in FIG. 2 as "UPDATED STATUS DATA") to the data manager 114 and the schedule generator 116. As indicated at 142, the data manager 114 determines feedback for the power control server 118. The feedback can characterize operational performance of the energy storage system 102. The data manager 114 provides feedback data (labeled in FIG. 2 as "FEEDBACK DATA") to the power control server.

At predetermined intervals, as indicated at 146, the power control server 118 updates the commitment schedule to incorporate new information in the feedback data and new information from other sources such as the utility. The updated commitment schedule is provided back to the data manager 114 of the schedule manager 108, such that the process demonstrated by the timing diagram 100 is repeated.

By controlling the energy storage system 102 in the manner depicted in the timing diagram 100, power efficiency, as well as the revenues for operation of the energy storage system 102 are elevated and the costs for consuming power (e.g., by the premises) are curtailed. Further, through the periodic and/or asynchronous use of the status data and feedback data, the operation of the energy storage system 102 is being continuously adjusted to reflect real-world conditions.

Figure 3:
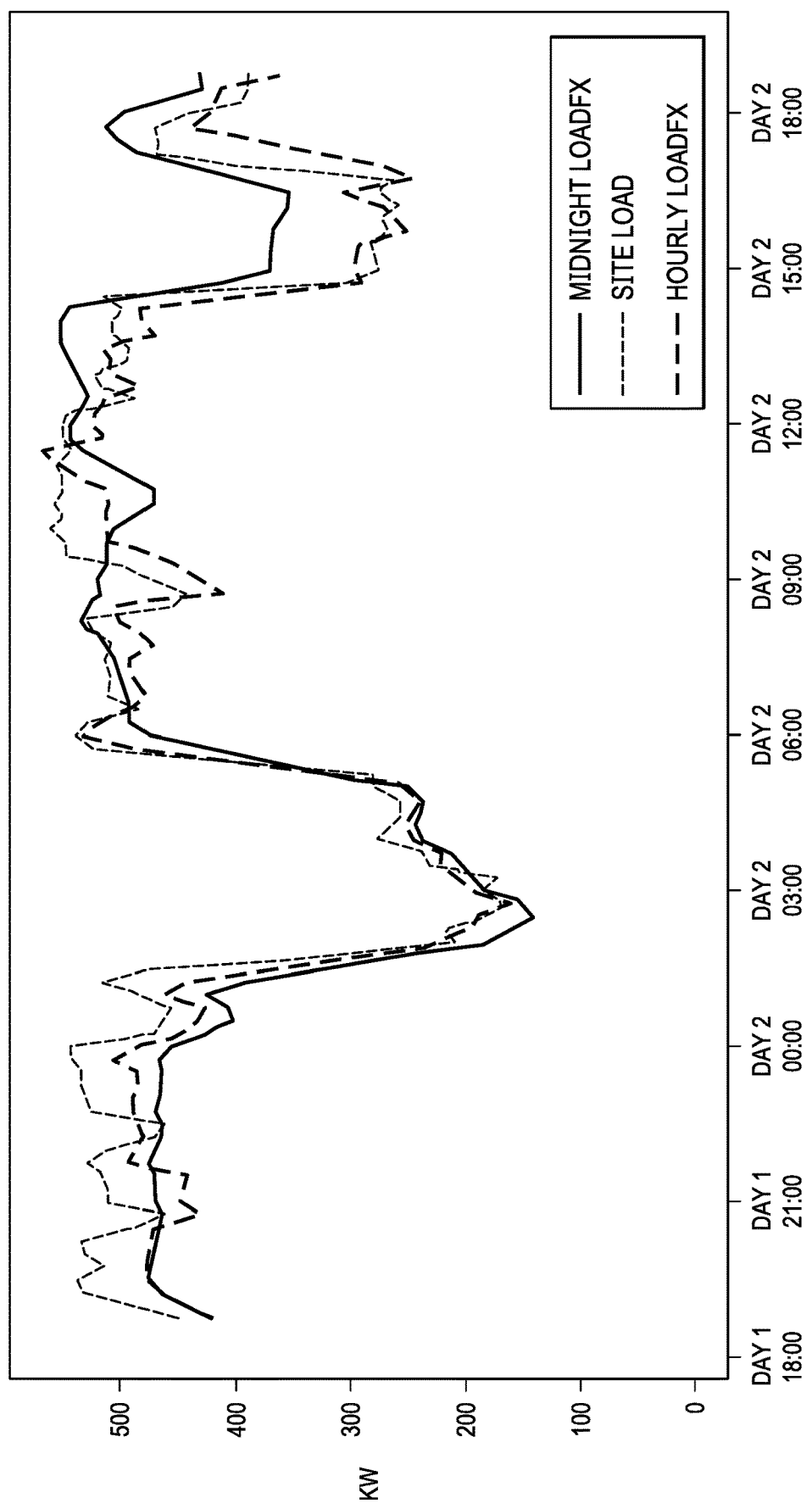
FIG. 3 illustrates a graph that plots a predicted load and a measured load of an energy storage system as a function of time.

FIG. 3 illustrates an example of a graph 200 that plots forecasted load generated updated at midnight ("MIDNIGHT LOAD FX"), a forecasted load, updated hourly ("HOURLY LOAD FX") and an actual measured load ("SITE LOAD") as a function of time. The forecasted load could be representative of a load (power demand) predicted by the forecast engine 82 of FIG. 1 and/or the forecast engine 111 of FIG. 2. As demonstrated, the forecasted load updated at midnight and the forecasted load that is updated hourly is relatively accurate.

Figure 4:
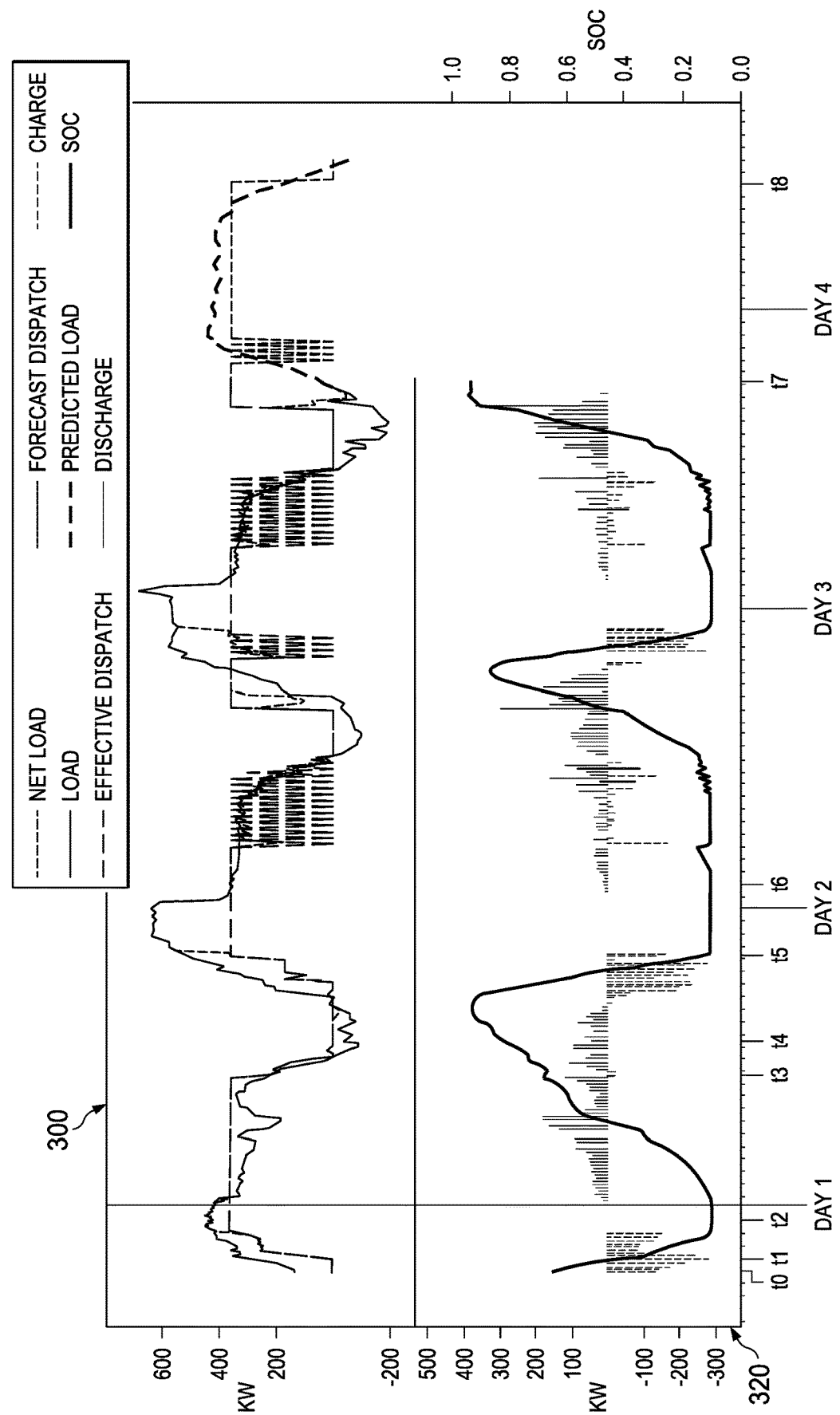
FIG. 4 illustrates charts that plots a dispatch of an energy storage system and a operation mode of the energy storage system as a function of time.

FIG. 4 illustrates an example of a first graph 300 that plots a load of a premises (in kilowatts) with an energy storage source (e.g., the energy storage source 56 of FIG. 1) as a function of time in a time period. FIG. 3 also includes a second graph 320 that plots a state of charge (SOC) of the energy storage source as a function of time along with an operational state as a function of time in the time period. In the first graph 300 and the second graph 320, from times $t_0$ to $t_1$ and from times $t_5$ to $t_6$ it is presumed that an associated power grid is experiencing a peak time. Additionally, from time $t_1$ to $t_2$, $t_3$ to $t_4$ and after time $t_8$ it is presumed that the power grid is experiencing a transition time (switching between a peak time and an off-peak time or vice versa). Further, from times $t_2$ to $t_3$ and from times $t_6$ to $t_8$, it is presumed that the power grid is experiencing off-peak times. Further still in the first graph 300 and the second graph 320, it presumed that a current time is about time $t_7$, such wherein a forecasted load ("LOAD FX") a forecasted dispatch ("FORECAST DISPATCH") are predicted.

The first graph 300 also includes an effective dispatch ("EFFECTIVE DISPATCH") that characterizes an effective amount of power discharged by the energy storage source. As illustrated in the first graph 300, the effective dispatch is greater than or equal to '0' W. Further, the first graph 300 includes a net load that characterizes a load of the premises that accounts for the effect on the load as a result of the discharge of power by the energy storage source.

The second graph 320 also includes a state (charge or discharge) of the energy storage system. As demonstrated by the second graph during peak times, namely time intervals $t_0$ to $t_1$ and $t_4$ to $t_5$, the energy storage system frequently operates in a discharge mode. Additionally, during a relatively short off-peak time interval, namely between times $t_2$ to $t_3$, the energy storage system frequently operates in a charge mode. Furthermore, during an extended interval of off-peak time (e.g., a weekend), the energy storage system rapidly switches between a charge mode and a discharge to improve power efficiency and elevate revenue.

Figure 5:
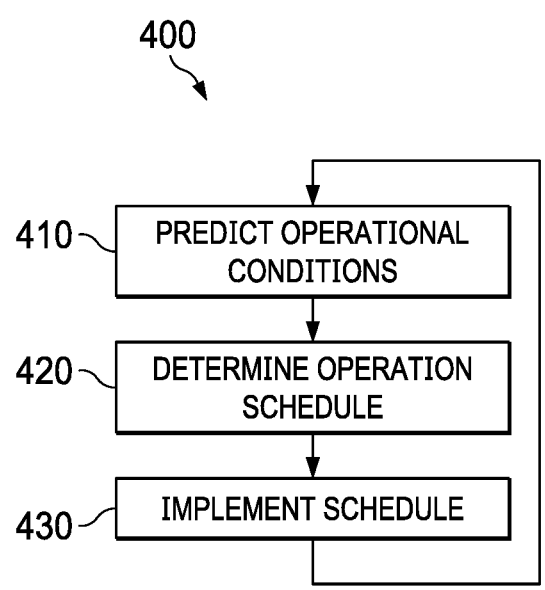
FIG. 5 illustrates a flowchart of an example method for controlling an energy storage system.

In view of the foregoing structural and functional features described above, example methods will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. Some portions of the example method of FIG. 5 can be implemented as instructions stored in a non-transitory machine-readable medium. The instructions can be accessed by a processing resource (e.g., one or more processor cores) and executed to perform the methods disclosed herein.

FIG. 5 illustrates a flowchart of an example method 400 operating an energy storage system (e.g., the energy storage system 50 of FIG. 1 and/or the energy storage system 102 of FIG. 2) to elevate power efficiency and revenue and to curtail costs. At 410, a forecast engine (e.g., the forecast engine 82 of FIG. 1 and/or the forecast engine 111 of FIG. 2) predicts operating conditions of the energy storage system for a time period in the future based on a predicted load and value history for a power consuming premises (e.g., the premises 54 of FIG. 1). The operating conditions, can include, for example, a predicted load, a predicted value of power, weather, etc. At 420, a schedule manager (e.g., the schedule manager 80 of FIG. 1 and/or the schedule manager 108 of FIG. 2) determines an operation schedule for an energy storage system coupled to the power consuming premises based on the predicted operating conditions. The operation schedule specifies time intervals and corresponding operation modes for the energy storage system within the time period. In some examples, the operation schedule may specify that the energy storage system operates in a discharge mode (or a sub-mode of the discharge mode) that discharges an energy storage source during a time interval within the time period with a highest predicted power revenue value (e.g., peak time). Conversely, the operation schedule may specify that the energy storage system operates in a charge mode (or sub-mode of the charge mode) that charges an energy storage source during a time interval within the time period with a lowest predicted power revenue value (e.g., off-peak time).

At 430, the operating schedule is implemented on the energy storage system. Implementation of the operating schedule instantiates changing of an operation mode of the energy storage system based on the schedule in a manner to elevate power efficiency, revenue and curtail cost. The method 400 returns to 410, such that the process 400 is repeated.

In view of the foregoing structural and functional description, those skilled in the art will appreciate that portions of the systems and methods disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine-readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine-readable medium having machine-readable instructions, the machine-readable instructions comprising:
    a forecast engine that generates forecast data that characterizes predicted operating conditions of an energy storage system for a given time period in the future, wherein the predicted operating conditions are based on a load history for a power consuming premises coupled to the energy storage system and on a value history for power provided to and consumed from a power grid, wherein the load history of the power consuming premises characterizes unmetered power transferred to the power consuming premises, metered powered transferred from the power grid to the power consuming premises and metered powered exchanged from the energy storage system to the power grid; and
    a schedule manager that generates an operation schedule for operating the energy storage system based on the forecast data, wherein the operation schedule includes charge and discharge patterns for an energy storage source that are tuned to curtail power costs and/or elevate power revenue value for operating the energy storage system over the given time period in the future;
    wherein the schedule manager causes a controller of the energy storage system to operate the energy storage system in a plurality of operation modes by selectively controlling a plurality of switches of the energy storage system based on the operation schedule such that the energy storage source is charged and/or discharged over the given time period, wherein:
        in a first state a first switch of the plurality of switches couples an energy generator of the energy storage system to the energy storage source, a second switch of the plurality of switches decouples the energy generator from a power regulator of the energy storage system, and a third switch of the plurality of switches decouples the power regulator from the power grid;
        in a second state the first switch decouples the energy generator from the energy storage source, the second switch couples the energy generator to the power regulator, and the third switch one of couples the power regulator to the power grid and decouples the power regulator from the power grid; and
        in a third state the first switch couples the energy generator to the energy storage source, the second switch couples the energy generator to the power regulator and the third switch one of couples the power regulator to the power grid and decouples the power regulator from the power grid.

2. The medium of claim 1, wherein the predicted operating conditions are based on weather data that characterizes predicted weather for the given time period.

3. The medium of claim 2, wherein the schedule manager receives a commitment schedule from a power control server, wherein the commitment schedule includes one or more compulsory events for the energy storage system and the operation schedule is further based on the commitment schedule.

4. The medium of claim 1, wherein the forecast engine receives data that incorporates substantially real-time status information of the energy storage system.

5. The medium of claim 1, wherein in the first state the first switch couples the energy generator directly to the energy storage source, or in the third state the first switch couples the energy generator directly to the energy storage source.

6. The medium of claim 1, wherein in the first state a fourth switch of the plurality of switches decouples an inverter of the power regulator from the power consuming premises and a fifth switch of the plurality of switches decouples the energy storage source from the power grid.

7. The medium of claim 1, wherein in the second state the third switch couples an inverter of the power regulator to the power grid and a fourth switch of the plurality of switches one of couples the inverter to the power consuming premises and decouples the inverter from the power consuming premises.

8. The medium of claim 7, wherein in the second state a fifth switch of the plurality of switches couples the energy storage source to the power grid.

9. The medium of claim 1, wherein in the third state the third switch one of couples an inverter of the power regulator to the power grid and decouples the inverter of the power regulator from the power grid, and a fourth switch of the plurality of switches one of couples the inverter of the power regulator to the power consuming premises and decouples the inverter of the power regulator from the power consuming premises.

10. The medium of claim 1, wherein in the third state the third switch couples an inverter of the power regulator to the power grid.

11. The medium of claim 10, wherein in the third state a fourth switch of the plurality of switches decouples the inverter of the power regulator from the power consuming premises.

12. The medium of claim 1, wherein in the third state the third switch decouples an inverter of the power regulator from the power grid and a fourth switch of the plurality of switches couples the inverter of the power regulator to the power consuming premises.

13. The medium of claim 1, wherein in the third state the third switch couples an inverter of the power regulator to the power grid and a fourth switch of the plurality of switches couples the inverter of the power regulator to the power consuming premises.

14. An energy storage system comprising:
an energy storage source that stores electric power provided by an energy generator;
a power regulator disconnectedly coupled to the energy storage source and to a power grid, the power regulator comprising a controller that controls an operation mode of the energy storage system; and
a plurality of switches that can be selectively activated and deactivated;
an operation computer that dictates a plurality of operation modes for the energy storage system by selectively controlling the plurality of switches based on an operation schedule, wherein in a first state a first switch of the plurality of switches couples an energy generator to the energy storage source, a second switch of the plurality of switches decouples the energy generator from a power regulator of the energy storage system, and a third switch of the plurality of switches decouples the power regulator from the power grid, in a second state the first switch decouples the energy generator from the energy storage source, the second switch couples the energy generator to the power regulator, and the third switch one of couples the power regulator to the power grid and decouples the power regulator from the power grid, and in a third state the first switch couples the energy generator to the energy storage source, the second switch couples the energy generator to the power regulator and the third switch one of couples the power regulator to the power grid and decouples the power regulator from the power grid;
wherein the operation computer comprises:
a non-transitory memory that stores machine-readable instructions; and
a processing unit that accesses the memory and executes the machine-readable instructions, the machine-readable instructions comprising:
a forecast engine that generates forecast data that characterizes predicted operating conditions of the energy storage system for a given time period in the future, wherein the predicted operating conditions are based on a load history for the energy storage system and on a value history for power provided to and consumed from the power grid; and
a schedule manager that executes a tuning algorithm to generate the operation schedule for operating the energy storage system based on the forecast data that dictates time intervals to charge and discharge the energy storage source, wherein operation schedule is tuned to curtail power cost and/or elevate power revenue value for operating the energy storage system over the given time period in the future.

15. The system of claim 14, further comprising the energy generator that is disconnectedly coupled to the power regulator and to the energy storage source based on a state of a corresponding switch of the plurality of switches.

16. The controller of claim 15, wherein the energy generator comprises one of a photovoltaic array, a wind turbine and a fossil fuel generator.

17. The controller of claim 15, wherein energy storage system is a behind the meter energy storage system in proximity to a power consuming premises that is disconnectedly coupled to the power regulator based on a state of a respective switch of the plurality of switches, wherein the load history for the energy storage system characterizes unmetered power transferred to the power consuming premises from the energy storage source and a combination of metered power transferred from the power grid to the power consuming premises and power exchanged from power regulator to the power grid.

18. The energy storage system of claim 15, wherein the operation schedule causes the energy storage system to operate in a combined charging mode for a given time interval within the given time period, wherein power generated from the energy generator and power provided from the power grid is employed to charge the energy storage source.

19. The energy storage system of claim 18, wherein the operation schedule causes the energy storage system to operate in a local charging mode for another time interval within the given time period, wherein power generated from the energy generator is employed to charge the energy storage source.

20. The energy storage system of claim 14, wherein the power regulator is disconnectedly coupled from a power consuming premises based on a state of a respective switch of the plurality of switches that is also coupled to the power grid.

21. The energy storage system of claim 20, wherein the operation schedule causes the energy storage system to operate in a combined discharge mode for a given time interval that has a highest power cost within the given time period, wherein the power provided from the energy generator and the power storage source is provided to the power grid and the power consuming premises.

22. The energy storage system of claim 21, wherein the operation schedule causes the energy storage system to operate in a grid discharge mode for another time interval within the given time period that has a highest power revenue value, wherein power provided from the energy generator and the power storage source is provided to the power grid and the power regulator is disconnected from the power consuming premises.

23. The energy storage system of claim 22, wherein the power revenue value of power provided to the power grid is greater than a power cost of power provided by the power grid during the other time interval.

24. The energy storage system of claim 14, wherein the schedule manager updates the operation schedule periodically based on data provided from the power regulator that characterizes measured operating conditions of the energy storage system.

25. The energy storage system of claim 14, wherein the predicted operating conditions characterized in the forecast data are further based on weather data that characterizes weather for the energy storage system over the given time period.

26. The energy storage system of claim 14, wherein the schedule manager receives a commitment schedule from a power control server that identifies an operating mode for the energy storage system for at least one time interval within the given time period.

27. A method comprising:
  predicting operating conditions of an energy storage system that characterizes a predicted load for a power consuming premises coupled to the energy storage system for a time period in the future and a value history for power provided to and consumed from a power grid, wherein the load history of the power consuming premises characterizes unmetered power transferred to the power consuming premises, metered powered transferred from the power grid to the power consuming premises and metered powered exchanged from the energy storage system to the power grid;
  determining an operation schedule for the energy storage system for the time period in the future based on the predicted operating conditions, wherein the operation schedule specifies operation of the energy storage system in a plurality of different operation modes for a plurality of different time intervals within the time period; and
  causing a controller of the energy storage system to operate the energy storage system in a plurality of operation modes by selectively activating and deactivating a plurality of switches of the energy storage system based on the operation schedule such that an energy storage source of the energy storage system is charged and/or discharged in a manner to elevate revenue and curtail cost, wherein:
    in a first state a first switch of the plurality of switches couples an energy generator of the energy storage system to the energy storage source, a second switch of the plurality of switches decouples the energy generator from a power regulator of the energy storage system, and a third switch of the plurality of switches decouples the power regulator from the power grid;
    in a second state the first switch decouples the energy generator from the energy storage source, the second switch couples the energy generator to the power regulator, and the third switch one of couples the power regulator to the power grid and decouples the power regulator from the power grid; and
    in a third state the first switch couples the energy generator to the energy storage source, the second switch couples the energy generator to the power regulator and the third switch one of couples the power regulator to the power grid and decouples the power regulator from the power grid.

28. The method of claim 27, wherein the operation schedule specifies that the energy storage system operates in a discharge mode that discharges an energy storage source during a time interval within the time period with a highest power revenue value.

29. The method of claim 28, wherein the operation schedule specifies that the energy storage system operates in a charge mode that charges the energy storage source during a time interval within the time period with a lowest power cost.

* * * * *